March 8, 1966   F. R. WILLIAMS ET AL   3,239,403
METHOD OF JOINING TWO MEMBERS BY MEANS OF AN ADHESIVE
COATED CARBON CLOTH RESISTANCE MEMBER
Filed Jan. 6, 1965   2 Sheets-Sheet 1

INVENTORS.
RICHARD S. NEELY,
FRANK R. WILLIAMS.
BY
Brown, Critchlow, Flick & Peckham.
their
ATTORNEYS.

March 8, 1966  F. R. WILLIAMS ET AL  3,239,403
METHOD OF JOINING TWO MEMBERS BY MEANS OF AN ADHESIVE
COATED CARBON CLOTH RESISTANCE MEMBER
Filed Jan. 6, 1965  2 Sheets-Sheet 2

INVENTORS.
RICHARD S. NEELY,
FRANK R. WILLIAMS.
BY
Brown, Critchlow, Flick & Peckham
their
ATTORNEYS.

United States Patent Office 3,239,403
Patented Mar. 8, 1966

3,239,403
METHOD OF JOINING TWO MEMBERS BY MEANS OF AN ADHESIVE COATED CARBON CLOTH RESISTANCE MEMBER
Frank R. Williams and Richard S. Neely, Erie, Pa., assignors to Lord Corporation, a corporation of Pennsylvania
Filed Jan. 6, 1965, Ser. No. 423,663
11 Claims. (Cl. 156—275)

This application is a continuation-in-part of our copending application Serial Number 156,016, filed November 30, 1961, now abandoned.

This invention relates to the joining of two members through opposed surfaces, and it includes methods as well as novel means for accomplishing this purpose.

The invention has to do with formation of joints with resinous or other adhesives between two or more members at least one of which is metallic, and it includes, by way of example, the making of lap joints, continuous joints, intermittent joints similar to spot welds, as well as laminates of two or more members.

If it is attempted to join two metallic members by disposing a resinous adhesive between the surfaces to be joined and supplying heat externally, various difficulties are encountered in producing satisfactory joints. For instance, the heat conductivity of the metallic members may be, and commonly is, such as to make it difficult to get enough heat into the glue line to melt a thermoplastic resin or to cure a thermosetting resin, especially where the metallic members are of substantial thickness or of high heat conductivity, e.g. aluminum or iron. Alternatively, so much heat must be applied to effect bonding that desired properties of the metallic members may be adversely affected. Furthermore, such procedures are slow, cumbersome and thus uneconomical.

It has been proposed to overcome the foregoing difficulties by supplying heat internally of the desired joint by disposing between the metallic parts to be joined a metallic resistance member, such as metal foil, perforated metal or metallic screen, coated with resinous adhesives, and passing an electric current through the resistance member to activate the resinous adhesive, with formation of the desired joint upon discontinuance of the current with subsequent cooling of the assembly. Such proposals have not attained commercial significance because of problems now known to be due to inherent characteristics of metallic resistance elements, as will be elaborated upon hereinafter.

It is among the objects of this invention to provide method and means for making joints of various types, such as those mentioned above, with resinous or other adhesives between two members at least one of which is metallic, which is simple, easily practiced with commonly available materials, rapid, avoids the foregoing and other disadvantages of prior art practices, and is productive of sound joints without impairment of the properties of the joined parts.

A further object is to provide such method and means whereby the heat required to institute bonding action of the adhesive is generated in situ and localized at contiguous surfaces of the elements to be joined.

Other objects will appear from the following specification.

The invention will be described with reference to the accompanying drawings in which.

Figure 1:
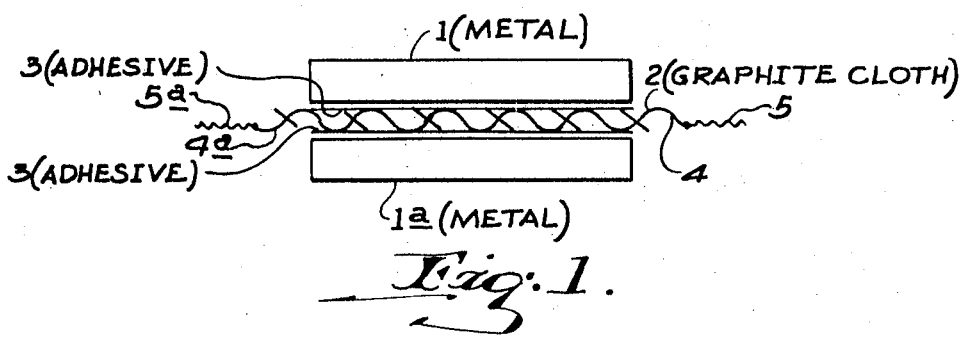
FIG. 1 is a side elevation of a pair of metallic members having disposed between them a sheet of graphite cloth coated with resinous adhesive.

We have discovered, and it is upon this that our invention is in large part predicated, that the objects of the invention are attained with two elements to be joined at least one of which is metallic by disposing between them an essentially carbon electrically conducting member coated with heat activatable resinous or other adhesive, and heating said member electrically to activate the adhesive to cause it to wet the surfaces to be joined so that when heating is discontinued the adhesive will solidify and cement the elements together. The electrically conducting carbon member may be heated by passing an electric current through it or by electric currents generated within it, as by high frequency induction.

As used herein the term "heat activatable adhesive" contemplates those normally solid synthetic resin polymers (1) which when heated to a characteristic temperature melt and are capable of flowing but which when cooled solidify and exert an adhesive action, i.e., thermoplastic resins, (2) those normally solid synthetic resin polymers which when heated to a characteristic temperature, with or without a catalyst, are converted chemically to an irreversible thermoset state in which they are not thereafter capable of plastic deformation without alteration of the integrity of the converted molecule, and (3) inorganic solids capable of being melted by and functioning in accordance with the practice of the invention, such as glasses, alkali metal silicates, etc.

The term essentially carbon electrically conductive element as used herein is applied to materials exemplified by graphite cloth, such as a woven graphite fiber cloth, carbon yarn and cloth woven or otherwise formed from it. For brevity the materials which characterize the invention may be termed carbon fabrics.

The resinous adhesives of this invention may be applied to such materials in various ways available in the art, as by spraying, brushing or dipping the electrically conductive elements in solutions of the adhesives, dipping them in molten thermoplastic resin, or by associating carbon yarn with filaments of the resins, which may be accomplished in various ways. Inorganic adhesives may be converted to particulate form and mixed with a binder for application to the carbon cloth.

The use of adhesive coated carbon fabric resistance elements in accordance with the invention provides a number of highly significant factors which render the invention in a category essentially and uniquely distinct from the use of adhesive coated metallic electric conductors as proposed heretofore. One such advantage of the essentially carbon conducting elements derives from the negative thermal coefficient of resistivity such a conductor provides in conjunction with a constant voltage power supplying a rather constant temperature gradient between the members to be joined and the conducting member, and this property results in rapid heating of the adhesive and the contiguous surfaces of the elements to be joined, in comparison with metal heating elements which have positive coefficient of thermal resistivity as a result of which when current is applied there is an initial large surge of current followed by a decrease in the heat developed. Also, the initial current surge experienced with metallic heaters may fuse them unless special steps are taken to suppress the surge. The essentially carbon resistance elements used in the practice of this invention heat up rapidly without current surge, and the constant temperature gradient referred to gives heat transfer efficiency to the joined system without hot spots.

The formation of joints between two members at least one of which is metallic requires a high heat input to make successful joints because the heat conductivity of metal is such that heat is rapidly transferred away from the joint which may defeat joint formation, especially in the case of adhesives which must reach high temperatures, even as high as 500° F., for the formation of a successful bond, and experience has shown that metallic resistance elements are incapable of supplying the necessary high heat input, as will appear. Graphite and carbon cloth resistance elements are entirely adequate for bonding even relatively thick metallic members with high temperature adhesives. This may be exemplified by the following considerations.

It can be shown that from the formula $$W = \frac{I^2 r l t}{A}$$

where W is heat generated in joules, I is amperes, r is the resistivity of the metal in ohm-centimeters, t is time in seconds, l is the length of the body in the direction of current flow in centimeters, and A is the area of the body normal to the direction of flow in square centimeters the heat generated with aluminum at 20° C. and graphite cloth at 20° C. will be Aluminum $\rule{2cm}{0.4pt}$ $2.62 \times 10^{-6} \frac{I^2 l t}{A}$ Graphite cloth $\rule{2cm}{0.4pt}$ $4200 \times 10^{-6} \frac{I^2 l t}{A}$ It follows that for heaters of the same dimensions, amperage and time of operation the graphite cloth will generate 4200/2.62 or 1600 times more heat than aluminum. It follows that graphite cloth is uniquely superior to aluminum in providing the wattage required for adhesive bonding; the superiority of carbon fabrics over other metals that might be used can be demonstrated similarly.

Furthermore, the relatively high resistance of carbon fabrics, compared to metallic heaters, simplifies power supply requirements. For metallic and graphite heaters of similar geometry (i.e. length, width, and thickness) the high resistance of graphite draws moderate amperes at moderate voltage while metallic heaters with their inherent low resistance draw high amperes at very low voltage to obtain similar wattage per square inch of projected area. This necessitates the use of heavy amperage-carrying leads in the case of metallic heaters. For example, take the case of three resistance members each 5 mils thick x 1" wide x 1" long, one is graphite, one is aluminum foil, and one is steel foil. To supply them with 2.4 watts of power per square inch of area, what amperage and volts are necessary to do this? Conventional computations show:

|  | Al Foil | Steel Foil | Graphite Cloth (WCO 115) |
| --- | --- | --- | --- |
| Resistance—ohms | 206×10⁻⁴ | 9.44×10⁻³ | 2.4 |
| Potential—volts | 0.022 | 0.0475 | 2.4 |
| Current—amperes | 108 | 50.4 | 1 |

When one considers the size of home wiring which is rated to carry 15 amps. of current, it is easy to visualize the large size wire needed to carry the above 50.4 amperes for steel and 108 amperes for Al, yet the carbon fabric poses no problem of wire size.

The strength of bonded joints is a function of glue-line thickness and homogeneity. Therefore, glue-line thickness is commonly used as a quality control on bonded joints.

The ability of graphite cloth to be flattened by pressure gives it the unique property needed for controlled glue-line thickness. For example: 26 mil, WCB grade, graphite cloth is 21 mils thick at 4.5 p.s.i.; 16 mils at 48.4 p.s.i.; 11 mils at 86.75 p.s.i.; 6 mils at 107 p.s.i.; etc. This property enables the assembler to duplicate or vary glue-line thickness from part to part by simply controlling the bonding pressure.

Such glue-line thickness control with metallic heating elements cannot be had without shims or positioning fixtures.

The strength of adhesive joints is dependent upon the formation of a homogeneous glue line. Voids or non-symmetrical reinforcing by fillers (i.e. fillers that are not wet thoroughly and dispersed uniformly throughout the adhesive) will weaken the joint. This weakness is partially caused by high stress discontinuities at sections which alter stresses at points of discontinuity and partially by poor adhesion between the filler and adhesive.

Graphite cloth is available in a grade made up of 0.0003-inch diameter filaments. The yarn bundles are penetrated readily by resinous adhesive solutions and the filaments are wet thoroughly to provide a homogeneous adhesive-cloth construction. This homogeneous construction creates efficient heat transfer between the graphite filaments and the adhesive during bonding, which helps prevent the formation of local hot spots that cause degradation of the adhesive.

Metallic heaters cannot be contained in a homogeneous fashion throughout the adhesive coating and stress concentrations at the heater adhesive interfaces are always a problem. Heat transfer efficiency between the heater and adhesive is low and hot spots and resulting degradation of the adhesive and failure of the heater element at these hot spots is common.

Physical contact between dissimilar metals may form galvanic cells which generate corrosion action with more or less rapid corrosion and destruction of the metal where the joint is formed from a metallic resistance element.

Joining even dissimilar metals by adhesive bonding in accordance with this invention provides an inert carbon fabric and adhesive barrier between the bonded members. This barrier enables the designer to adhesively join dissimilar metals with little concern for subsequent galvanic induced corrosion.

Another advantage of graphite cloth or carbon fabric is that as compared with metallic resistance elements it has high radiating surface per unit of area and low thermal mass. These properties combined with high emissivity give the cloth the unique property of being heated very rapidly and releasing large amounts of heat energy. Furthermore, carbon fabrics can be heated to a greater temperature than metal heaters which decreases bonding time substantially.

Figure 2:
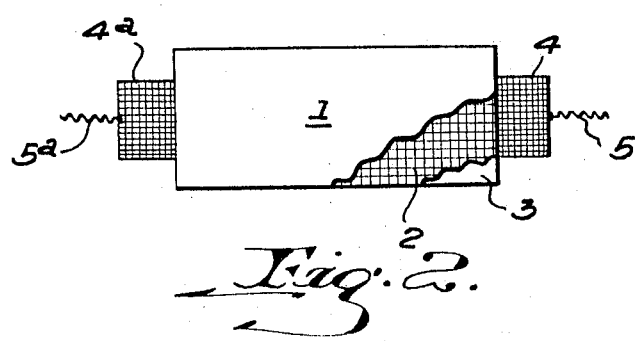
FIG. 2 is a plan view of the assembly of FIG. 1.

Having reference now to the drawings, FIGS. 1 and 2 are representative of the formation of a bond between two metal members 1 and 1a. Interposed between them is a length of graphite cloth 2 coated with, or encapsulated within, a heat activatable adhesive 3. The graphite cloth extends beyond the ends of the metal members to provide tabs 4 and 4a for connection to electrical leads 5 and 5a.

The thickness and the chemical and physical characteristics of the adhesive coating are determined by the intended application, for instance the particular metal or metals being joined. The coating may be either a thermoplastic or a thermosetting resin, or a fusible inorganic solid, again depending on the elements to be joined and the use to which the bonded assembly is to be put. These factors are within the skill of those familiar with the adhesive joining art.

In the practice of the invention the metallic members are assembled with the coated graphite cloth as shown in FIGS. 1 and 2. A power source is connected to the leads 5 and 5a so that heat is developed between the members 1 and 1a by the resistance of the graphite cloth 2 sufficient to melt the adhesive. Upon discontinuance of the electric current the resin or other adhesive will harden and produce bonding.

Figure 3:
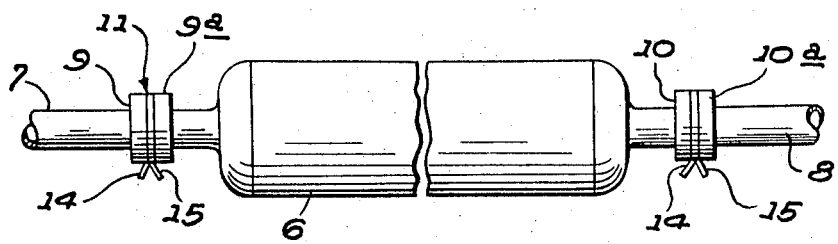
FIG. 3 is a schematic representation of the application of the invention to the joining of hollow members.
Figure 4:
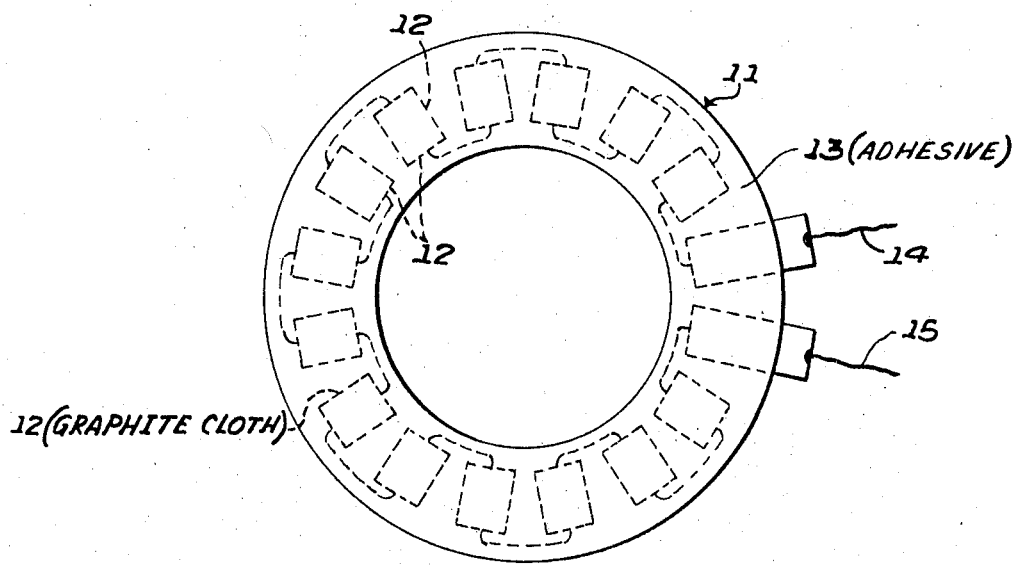
FIG. 4 is a plan view of means for joining the hollow members of FIG. 3.

FIGS. 3 and 4 are illustrative of the application of the invention to the joining of hollow members. In this case a muffler 6 is to be joined to a tail pipe 7 and to an engine manifold exhaust pipe 8. Joinder of the muffler to the two pipes is through flanges 9 and 9a and 10 and 10a. Disposed between each pair of flanges is a bonding element 11. As seen in FIG. 4 it comprises strips 12 of graphite cloth connected in series and encapsulated within a normally solid heat activatable adhesive 13. Tab leads 14 and 15 extend beyond the adhesive for connection to a power source. With the parts assembled as seen in FIG. 3 power is supplied through the terminal leads to activate the adhesive 13 whereupon the power is cut off to permit the adhesive to solidify and complete the joint. Should repair or replacement become necessary it is merely necessary to re-establish power to melt the adhesive in the case of a thermoplastic resin or to char it if the resin is thermosetting. Any of the elements of the muffler assembly may thus be removed and replaced.

Figure 5:
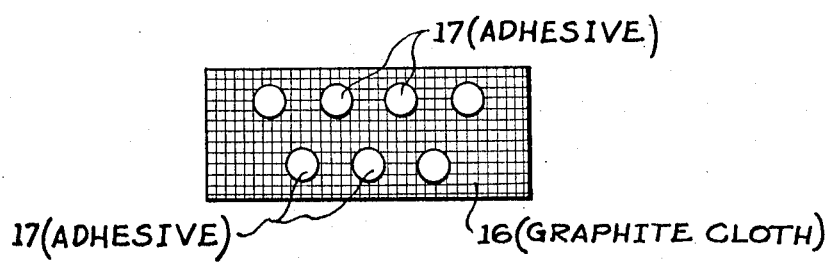
FIG. 5 is a plan view of a sheet of graphite cloth provided with spaced areas of adhesive in accordance with the invention for the making of interrupted or spot joints.

FIG. 5 illustrates a resistance element in accordance with the invention for the production of what may be termed spot joints by analogy with spot welding. It comprises a carbon fabric cloth member 16 bearing on one or both surfaces, as desired, a series of spaced areas 17 of restricted size of heat activatable adhesive of desired type. The use of this type of element for producing, for instance, temporary restricted area bonds will be understood from what has been said with reference to the practice of the invention.

A wide variety of thermoplastic and thermosetting resins of different characteristics are available and well known in the plastics art. Typical thermosetting resins include, by way of example, epoxy resins, phenolic resins, urea-formaldehyde resins, melamine resins, and numerous others. Typical thermoplastic resins include the polycarbonate, polyester and polyamide resins, for example. Information concerning these and other resins of both types is already available in the literature as well as in information supplied by the producers of these resins. Thus, information concerning epoxy resins is readily available in the book "Epoxy Resins" by Lee and Neville (New York, 1957), and a book of the same title by Skeist (New York, 1958). Much information concerning a large number of both types of resins is also to be found in such a number of texts typical of which is that of Golding entitled "Polymers and Resins" (New York, 1959). It is well within the skill of the artisan upon consideration of this disclosure to choose suitable materials from the wide variety available adapted to any particular need based upon such factors as the desired range of heat activating temperatures, the wetting power of the resin for particular metallic or plastic members, the polarity of the resin with regard to that of the members being joined, and the like, as will be understood by those familiar with the polymer art.

As an example of the practice of the invention, reference may be made to tests involving the bonding of aluminum with three heat activatable synthetic resins. These tests involved bonding of 2024T3 Alclad aluminum strips 1/16 inch thick, 1 inch wide and 4 inches long. The common practice has been to give aluminum a surface treatment to prepare it for receiving an organic coating, such as an organic adhesive. Accordingly, the aluminum strips were treated with a non-inhibited alkaline cleaner followed by a surface treatment in accordance with Example XII–D of the United States Patent Number 2,945,778.

The electrical conductors representative of the invention were of graphite cloth ½ inch wide and about 3 inches long. The graphite cloth was WCB grade, 0.026 inch nominal thickness supplied by National Carbon Division of Union Carbide Corporation. This is described as a plain weave, 7.3 ounces weight per square yard, 0.023 inch gauge. The count is 27 yarns per inch in the warp direction and 24 in the fill direction. The filament diameter is 0.0003 inch, and there are 1440 filaments per yarn bundle. The electrical and physical properties are stated to be:

Electrical resistance, ohms per square—
  At 70° F., in warp direction _____ 0.47
  At 70° F., in fill direction _____ 0.51
  At 1000° F., in warp and fill directions _____ 0.38
  At 3000° F., in warp and fill directions _____ 0.20
Tensile strength, pounds per inch—
  In warp direction _____ 25
  In fill direction _____ 23
Elongation at break, percent—
  In warp direction _____ 1.8
  In fill direction _____ 1.4

In the use of this graphite cloth in these tests the current was passed in the fill direction.

The adhesives used, presently to be described, were applied by brush and allowed to dry in air and this was repeated until visual inspection showed that the conductors were completely encapsulated.

Electrical energy was supplied by alternating current through a variable powerstat. Two different current density ranges were used in these tests, a low one such as would supply enough heat in the case of non-metallic members of low conductivity, and a high one such as was necessary to supply heat to metal members of high thermal conductivity. The coated conductors were placed between the aluminum strips to be bonded which overlapped each other about ½ inch in accordance with the standard ASTM Lap Shear test D1002–53T. Electrical terminals contacted the end portions of the conductive strips to provide an effective heating distance between the terminals of 1.6 inches, or an actual heating area of 0.8 square inch.

Three adhesives were used, as follows:

*Adhesive I*

This was a one-step phenol-formaldehyde (thermosetting) type resin, which, according to the supplier, had been prepared from a mixture of approximately 85 percent of phenol and 15 percent of ortho-cresol, catalyzed by hexamethylenetetramine. It was supplied as a solution of approximately 70 percent solids content in methyl isobutyl ketone; the solution typically had a specific gravity of 1.07 to 1.08 at 77° F. (25° C.) and a Gardner bubble viscosity of Z–3 to Z–4 (approximately 46 to 63 stokes). The nitrogen content, based on solids, was reported to be approximately 1.25 percent and the methylol content as approximately 4 percent. The water content of the solution was approximately 1½ percent. Before use in coating the electrical conductors, the solution was further diluted with methyl isobutyl ketone to form a solution of 25 percent solids content.

*Adhesive II*

This was a resin called Phenoxy 8 sold by Union Carbide Plastics Division. It is a low softening point thermoplastic polymer. This material is said to be prepared by condensation of equimolar amounts of epichlorohydrin and bis-phenol A to produce a polymer of approximately 100 repeating units of the two above monomers. The structural representation follows:

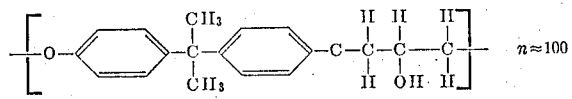

The resin is said to have a softening temperature of 212° F., a specific gravity of 1.18, an ultimate tensile strength of 9,000 to 9,500 pounds per square inch and an ultimate elongation of 50 to 100 percent.

For use in coating the electrical conductors, the polymer was dissolved in methyl ethyl ketone to form a solution of 25 percent solids content.

*Adhesive III*

This was a high softening point thermoplastic polymer. It is a polyester said by the producer to have the following structural representation:

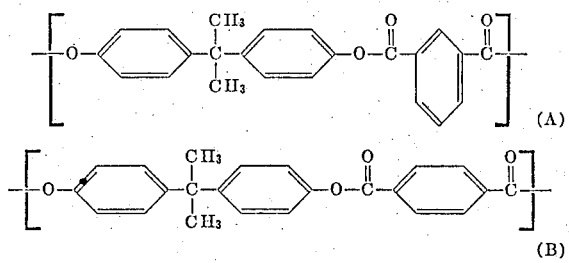

wherein A and B are approximately equal. The values of A and B in that formula are not known. Such a structure is described by Sorenson and Campbell in the book "Preparative Methods of Polymer Chemistry," Interscience Publishers, Inc., New York, 1961, pages 119 and 120. The material is said to have a softening point of about 280 to 300° C. (536 to 572° F.), a density of 1.2 grams per cubic centimeter, a tensile yield strength of 10,000 pounds per square inch, an elongation at yield of 10 to 13 percent and an elongation at break of 20 percent.

This material is difficultly soluble in organic solvents. The solution used for coating of the electrical conductors was 10 percent polymer in a mixture of one part methylene chloride and three parts dioxane by weight.

These tests were of 10 seconds' duration with a load of 21 p.s.i. applied to the lap joints.

To demonstrate the outstanding advantage of graphite cloth resistance members in comparison with metallic resistance members, a parallel series of tests was run under the same conditions and with the same adhesives using resistance members of the same size of (1) Reynolds Wrap Extra Heavy Aluminum Foil, having a thickness of 0.013 inch to 0.015 inch, as measured by a micrometer, was used as an aluminum conductor, and (2) perforated metal provided by 25 count Lektromesh supplied by C. O. Jelliff Manufacturing Corporation, 120 Pequot Road, Southport, Connecticut. This is a nickel-clad copper sheet having a thickness of about 0.007 inch by micrometer which is chemically eroded to form 0.028 inch square holes and a land distance of 0.012 inch, the open area being 49 percent of the total.

The results of these tests are given in the following table:

| Test Number | Adhesive | Electrical Conductor | Volts | Amps | Volt-Amps. per In.² | Results |
|---|---|---|---|---|---|---|
| 1B | I | Aluminum Foil | 1.8 | 30 | 67.5 | Did not bond; adhesive not cured. |
| 1C | I | Perfor. Sheet | 1.1 | 37.5 | 51.6 | Do. |
| 1A | I | Graphite Cloth | 6.5 | 6.1 | 49.5 | Bonded. |
| 2B | II | Aluminum Foil | 1.8 | 30 | 67.5 | Did not bond; adhesive not melted. |
| 2C | II | Perfor. Sheet | 1.1 | 37.5 | 51.6 | Do. |
| 2A | II | Graphite Cloth | 6.5 | 6.1 | 49.5 | Bonded. |
| 3B | III | Aluminum Foil | 1.8 | 30 | 67.5 | Did not bond; adhesive not melted. |
| 3C | III | Perfor. Sheet | 1.1 | 37.5 | 51.6 | Do. |
| 3A | III | Graphite Cloth | 6.5 | 6.1 | 49.5 | Bonded. |

| Test Number | Adhesive | Electrical Conductor | Volts | Amps | Volt-Amps. per In.² | Time, Seconds | Results |
|---|---|---|---|---|---|---|---|
| 4B | I | Aluminum Foil | 2.6 | 100 | 325 | ¹1 | Did not bond; conductor fused.² |
| 4C | I | Perfor. Sheet | 2.4 | 125 | 375 | ¹1 | Do. |
| 4A | I | Graphite Cloth | 17 | 17 | 361 | 10 | Bonded. |
| 5B | II | Aluminum Foil | 2.6 | 100 | 325 | ¹2 | Did not bond; conductor fused.³ |
| 5C | II | Perfor. Sheet | 2.4 | 125 | 375 | ¹2 | Do. |
| 5A | II | Graphite Cloth | 17 | 17 | 361 | 10 | Bonded. |
| 6B | III | Aluminum Foil | 2.6 | 100 | 325 | ¹5 | Did not bond; conductor fused.³ |
| 6C | III | Perfor. Sheet | 2.4 | 125 | 375 | ¹2 | Do. |
| 6A | III | Graphite Cloth | 17 | 17 | 361 | 10 | Bonded. |

¹ Fusing of the conductor.
² Resin not cured.
³ Resin not melted.

As evidencing the fact that the surface treatment applied to the aluminum conductors of the table was not responsible for the results of those tests, a further series of tests was run using Alclad and unclad strips of the same aluminum alloy which were merely degreased by wiping them with acetone. The results were the same.

A further and important advantage of the invention is due to the fact that graphite and carbon cloth with their relatively low modulus and limpness, as compared to metallic heaters, easily conform to nonplanar joints. This inherent limpness makes it unnecessary to custom preform the heater elements to match the joint contour. This is not true with metallic heaters which, except for very thin aluminum foil, must be pre-formed to the joint contour.

From what has been said it will be understood that the invention is applicable to the making of joints between, for example, a metal and a non-metal such as a plastic, an elastomer, or fiber glass. In this context, joints have been made in accordance with the invention between aluminum and fiber glass, steel and fiber glass, rubber and aluminum, rubber and aluminum, rubber and steel, and rubber and aluminum, steel and aluminum, and steel and wood.

As an example of bonding aluminum to non-metal, there were used ⅛" x 1" x 4" Fiberglas and ⅟₁₆" x 1" x 4" 2024T3 aluminum. The heater was WCG, graphite cloth, made by National Carbon Company, as follows:

| | |
|---|---|
| Weight, ounces/sq. yd. | 3.0 |
| Gage, inches | 0.012 |
| Count, yarns/inch: | |
| Warp | 35 |
| Fill | 31 |
| Filaments/yarn bundle | 480 |
| Filaments diameter, inch | 0.0003 |
| Tensile strength, lb./inch: | |
| Warp | 9.2 |
| Fill | 8.6 |
| Electric resistance at 70° F., ohms/sq.: | |
| Warp | 1.1 |
| Fill | 1.2 |
| At 1000° F., warp and fill | 0.9 |
| At 3000° F., warp and fill | 0.4 |
| Assay, minimum carbon, percent | 99.96 |

The heater was coated with 20% solids solution of Phenoxy 8 in methyl ethyl ketone by paint brush. Room temperature air drying evaporated the solvent between coats. Four coats of adhesive solution were applied to each side of the heater cloth covering the full 0.700" width and 1.0" length in the center of the heater with 1.0" on each end not coated. The non-coated ends of the heater cloth were used for terminal attachment.

The heater was sandwiched between the aluminum and Fiberglas parts which were lapped ½". The heater's uncoated ends were attached to electric terminals spaced 1.6" apart. Twenty-seven pounds per square inch normal pressure was applied by dead weight to squeeze the sandwich together. A step-down transformer connected to a 110 volt A.C. line supplied 23 volts across the heater resulting in 9 amperes of current through the heater in the fill direction. The current was maintained for 5 seconds to melt the adhesive. The current was then stopped and the sandwich was allowed to cool to room temperature, still under 27 p.s.i. normal pressure.

The glue line thickness was 0.009 inch, measured by micrometer. Room temperature lap shear ultimate strength of the bond was 1400 p.s.i.

From the foregoing discussion and description, it is evident that the invention provides a uniquely versatile means and process by which various joints, at least one member of which is metallic, can be made. While the invention has been described with relatively simple embodiments, it should be apparent that many other useful physical embodiments are possible. For example, it is contemplated that large adhesive enveloped resistance members be provided for applying large parts as, for example, table or desk tops to the sub-structure. It will also be evident that the temperature resistance of the joints produced in accordance with the invention can be readily controlled simply by using a thermoplastic or thermosetting adhesive of the requisite physical properties, for such materials are commercially available with a wide variety of properties. Similarly, the ability of a covering to adhere to a particular substrate is a readily determinable property, and the adhesive most suited to joining the parts desired is fully within the skill of the artisan.

One way of accomplishing the foregoing would be to use a mixture of, for example, compatible thermosetting and thermoplastic adhesives as the normally solid heat activatable adhesive coating on the resistance member. Alternatively, coatings made of successive layers of selected adhesives also could be used. This latter practice is of further interest where members to be joined require different adhesives for the best results. By way of example, where two different metals A and B are to be joined and the desired strength of the bonds is such that a thermosetting material should be used directly in contact with A while a thermoplastic would best provide the strength at B, a resistance member can first be coated on one side with a thermoplastic and then the other side can be provided with the desired thermosetting material. Of course, the reverse order of application of the different adhesives could be used as well. Other variations of the invention will occur to those skilled in the art upon considering the foregoing detailed description.

It is fully within the knowledge in the art to provide such combinations of thermoplastic and thermosetting resins which are compatible when molten. For instance, reference may be made to the Lee et al. book identified above where the authors describe the polyamides as being excellent thermoplastic adhesives (p. 223), and at page 270 they give a tabulation showing compatibility of epoxy resins with such thermoplastic resins as polyvinyl acetate, polyvinylformal and cumarone resins.

The properties of epoxy resins make them desirable for use in the practice of the invention where a thermosetting adhesive is desired. Thus, there is no water release in curing, no solvent is necessary that must be evaporated, and they exhibit low shrinkage and exert their action under low contact pressure.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. That method of joining two members at least one of which is metallic through opposing surfaces comprising placing a carbon cloth resistance member having a coating of a normally solid heat-activatable adhesive in contact with the surface to be joined, heating said resistance member electrically to activate said adhesive, and discontinuing said heating and permitting the assembly to cool.

2. A method in accordance with claim 1, said resistance member being woven graphite cloth.

3. A method according to claim 1, said adhesive being a thermoplastic resin.

4. A method in accordance with claim 1, said adhesive being a thermosetting resin.

5. A method in accordance with claim 1, said adhesive being a mixture of thermoplastic and thermosetting resins.

6. A method of adhesively joining opposing faces of two members at least one of which is metallic comprising placing in contact with said faces a carbon cloth resistance member having a coating on one surface of a normally solid heat-activatable adhesive productive of a desired bond characteristic at one of said faces, and on the other surface a coating of a different normally solid heat-activatable adhesive productive of a different bond characteristic at the other of said faces, passing an electric current through said resistance member to activate said adhesives by heat, then stopping the flow of current and permitting the adhesives to cool and join said members to one another.

7. Means for joining two materials at least one of which is metallic comprising a carbon cloth resistance member having a coating of a normally solid heat-activatable adhesive.

8. Means according to claim 7, said carbon cloth being a woven graphite cloth.

9. Means according to claim 7, said adhesive being a thermoplastic resin.

10. Means according to claim 7, said adhesive being a thermosetting resin.

11. Means according to claim 7, said cloth having applied thereto a mixture of thermoplastic and thermosetting resins.

No references cited.

EARL M. BERGERT, *Primary Examiner.*

D. J. DRUMMOND, *Assistant Examiner.*

Disclaimer 3,239,403.—*Frank R. Williams* and *Richard S. Neely*, Erie, Pa. METHOD OF JOINING TWO MEMBERS BY MEANS OF AN ADHESIVE COATED CARBON CLOTH RESISTANCE MEMBER. Patent dated Mar. 8, 1966. Disclaimer filed Dec. 6, 1968, by the assignee, *Lord Corporation*.

Hereby enters this disclaimer to claims 1 to 4, 7, 8 and 10 of said patent.
[*Official Gazette January 21, 1969.*]